(12) United States Patent
Chen et al.

(10) Patent No.: US 9,078,083 B2
(45) Date of Patent: Jul. 7, 2015

(54) APPLICATION SERVER AWARENESS OF DEVICE CAPABILITIES IN A WIRELESS NETWORK

(71) Applicant: Verizon Patent and Licensing Inc., Arlington, VA (US)

(72) Inventors: Xuming Chen, San Ramon, CA (US); Mingxing S Li, San Jose, CA (US); William C King, Lafayette, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 115 days.

(21) Appl. No.: 13/772,069

(22) Filed: Feb. 20, 2013

(65) Prior Publication Data
US 2014/0235258 A1 Aug. 21, 2014

(51) Int. Cl.
*H04W 72/00* (2009.01)
*H04W 4/00* (2009.01)

(52) U.S. Cl.
CPC .............. *H04W 4/003* (2013.01); *H04W 4/001* (2013.01)

(58) Field of Classification Search
USPC ............. 455/452.1, 435.1, 414.1, 466, 452.2, 455/424, 404.2, 558, 458
See application file for complete search history.

(56) References Cited

U.S. PATENT DOCUMENTS

| | | | |
|---|---|---|---|
| 7,711,362 B2 * | 5/2010 | Bumiller | 455/435.1 |
| 8,086,253 B1 * | 12/2011 | Kalamkar et al. | 455/466 |
| 2006/0223530 A1 * | 10/2006 | Bumiller | 455/435.1 |
| 2010/0222058 A1 * | 9/2010 | Pudney et al. | 455/435.2 |
| 2011/0225298 A1 * | 9/2011 | Brown et al. | 709/226 |
| 2011/0269437 A1 * | 11/2011 | Marusi et al. | 455/414.1 |
| 2012/0064908 A1 * | 3/2012 | Fox et al. | 455/452.2 |
| 2012/0094668 A1 * | 4/2012 | Vratskides | 455/435.1 |
| 2012/0184258 A1 * | 7/2012 | Kovvali et al. | 455/418 |
| 2012/0197981 A1 * | 8/2012 | Chan | 709/203 |
| 2012/0239771 A1 * | 9/2012 | Rasanen | 709/206 |
| 2013/0072234 A1 * | 3/2013 | Morrison | 455/456.3 |
| 2013/0124656 A1 * | 5/2013 | Peng | 709/206 |
| 2013/0166777 A1 * | 6/2013 | Chen et al. | 709/246 |
| 2013/0258865 A1 * | 10/2013 | Kovvali et al. | 370/241 |

* cited by examiner

*Primary Examiner* — Joseph Arevalo

(57) ABSTRACT

Capability information, relating to hardware and/or software capabilities of different types of mobile devices, may be used to tailor services provided to the mobile device based on the particular type of mobile device. In one implementation, a device, such as an application server that provide services to mobile devices, may: receive a request from a mobile device, for services; obtaining information indicating a type of the mobile device; obtain, based on the type of mobile device, information indicating capabilities of the mobile device; and provide the services to the mobile device, in which the provided services are tailored for the mobile device based on the capabilities of mobile device.

20 Claims, 8 Drawing Sheets

300

| 310 TAC | 320 Screen Size | 330 Memory | 340 Processor Type | 350 Touch-screen? | 360 Physical Keyboard? | 370 OS Version | 380 Authorized Applications |
|---|---|---|---|---|---|---|---|
| 12345612 | 4.2" | 16GB | 1Ghz | Yes | No | Android 4.1 | App1, App2, ... |
| ⋮ | ⋮ | ⋮ | ⋮ | ⋮ | ⋮ | ⋮ | ⋮ |
| 55512456 | 3.0" | 8GB | 1Ghz | No | Yes | Android 3.2 | App1 |

| TAC | Screen Size | Memory | Processor Type | Touch-screen? | Physical Keyboard? | OS Version | Authorized Applications |
|---|---|---|---|---|---|---|---|
| 310 | 320 | 330 | 340 | 350 | 360 | 370 | 380 |
| 12345612 | 4.2" | 16GB | 1Ghz | Yes | No | Android 4.1 | App1, App2, ... |
| ... | ... | ... | ... | ... | ... | ... | ... |
| 55512456 | 3.0" | 8GB | 1Ghz | No | Yes | Android 3.2 | App1 |

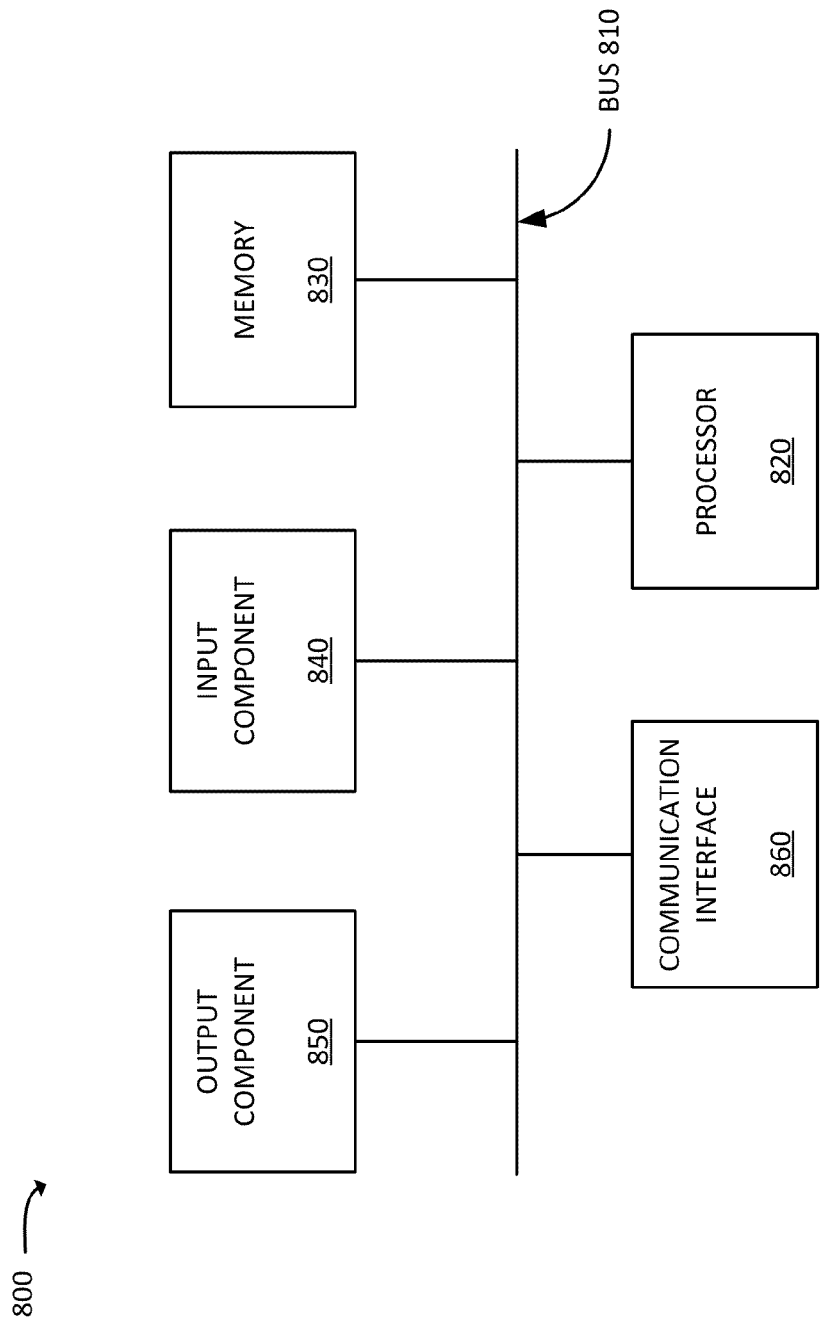

APPLICATION SERVER AWARENESS OF DEVICE CAPABILITIES IN A WIRELESS NETWORK

BACKGROUND

A mobile device (such as a wireless phone) is a device that can connect to a network, such as a network for making telephone calls or exchanging data, over a radio link. The network to which the mobile phone connects may be a wireless network (e.g., a cellular wireless network) provided by a mobile phone operator.

Mobile phones may obtain services, such as services relating to telephone calls, data connections, online storage, or other services, from application servers in the network. Different mobile devices may be associated with different device capabilities, such as different screen sizes, processor capabilities, or other device capabilities, that may affect the experience provided to a user of the mobile device when accessing a service provided by an application server.

BRIEF DESCRIPTION OF THE DRAWINGS

FIG. 3 is a diagram illustrating an example of a data structure that may be maintained to store capability information for mobile devices;

FIG. 8 is a diagram of example components of a device.

DETAILED DESCRIPTION OF PREFERRED EMBODIMENTS

The following detailed description refers to the accompanying drawings. The same reference numbers in different drawings may identify the same or similar elements.

Techniques described herein may provide for a database that stores capability information relating to the hardware and/or software capabilities of different mobile devices. The capability information may include, for example, the screen size of a particular mobile device, an amount of memory of a particular mobile device, the types of user input mechanisms (e.g., touchscreen, keypad, etc.) associated with a particular mobile device, etc. The database may be used by application servers to tailor (e.g., optimize and/or improve) the application experience provided to users of the mobile device. For example, if the mobile device includes a touchscreen, a user interface provided by the application server may be different than the user interface provided by the application server when the mobile device does not include a touchscreen.

Figure 1:
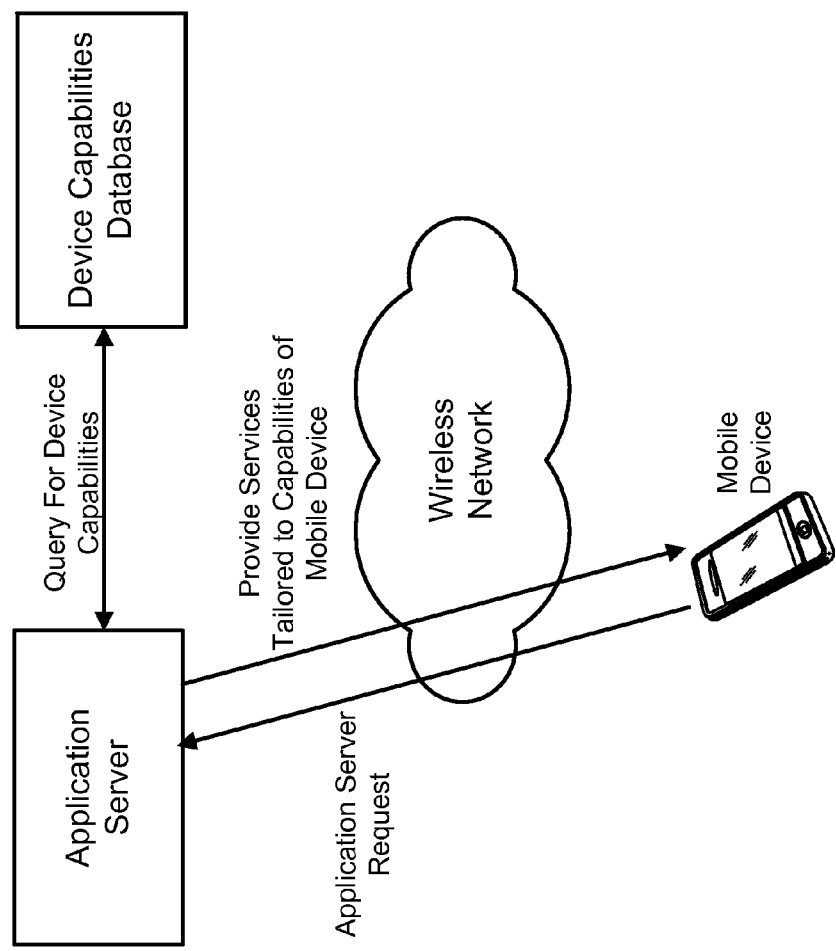
FIG. 1 is a diagram conceptually illustrating an example of an overview of concepts described herein.

FIG. 1 is a diagram conceptually illustrating an example of an overview of concepts described herein. As shown in FIG. 1, a mobile device, such as a cellular phone that obtains network conductivity through a wireless network, may use services, such as services provided by an application server. The mobile device may request services from the application server ("Application Server Request"). Some or all of the services provided by the application server may be tailored based on the capabilities of the mobile device, such as capabilities relating to the hardware used by the mobile device.

The application server may query a device capabilities database ("Query For Device Capabilities"). The device capabilities database may store hardware and/or software attributes associated with different types of mobile devices. For example, different manufacturers and/or models of smart phones may each be associated with different hardware and/or software capabilities and/or configurations.

Based on information received from the device capabilities database, the application server may provide services that are tailored to the capabilities of the mobile device. For example, as previously mentioned, the application server may vary a user interface, that is provided for the mobile device, based on the hardware supported by the mobile device. As another example, depending on the type of processor and/or memory supported by the mobile device, the application server may vary the ratio of client-side processing (e.g., processing performed by the mobile device) to server-side processing (e.g., processing performed by the application server). As another example, certain mobile device models may be prohibited from installing certain applications. The device capabilities information may include a list of the prohibited applications, and application provisioning decisions may thus be made based on a type of a mobile device. In general, the application server may, based on the information received from the device capabilities database, tailor the services provided to the mobile device in any of a number of possible ways.

Figure 2:
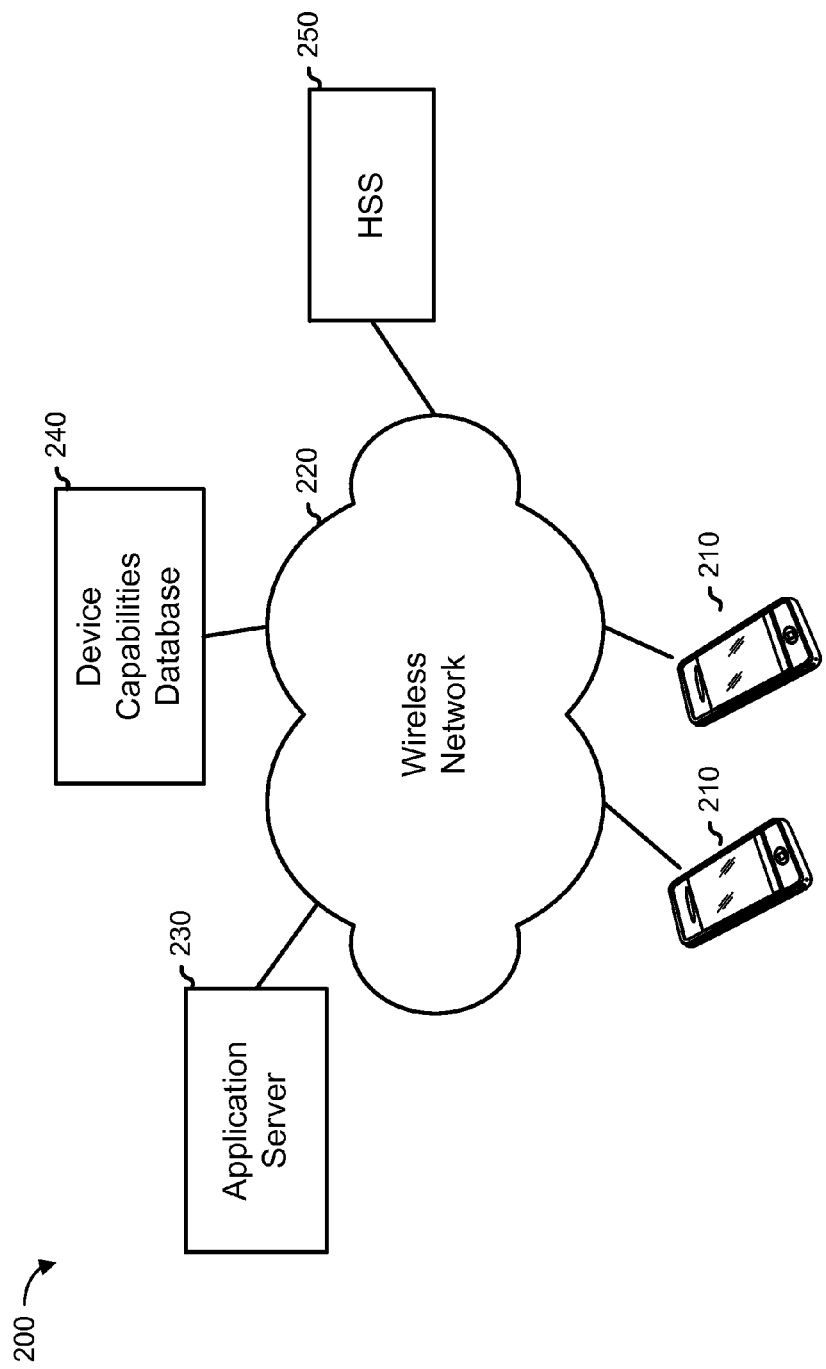
FIG. 2 is a diagram of an example environment in which systems and/or methods described herein may be implemented.

FIG. 2 is a diagram of an example environment 200 in which systems and/or methods described herein may be implemented. As illustrated, environment 200 may include one or more mobile devices 210 and a wireless network 220. Additionally, one or more computing devices, such as server devices and/or databases may be coupled to and/or be a part of wireless network 220. As illustrated, the computing devices may include application server 230, device capabilities database 240, and home subscriber service (HSS) 250.

Mobile devices 210 may include portable computing and communication devices, such as personal digital assistants (PDAs), smart phones, cellular phones, laptop computers with connectivity to a wireless network, tablet computers, etc. Mobile devices 210 may also include non-portable computing devices, such as desktop computers, consumer or business appliances, set-top devices (STDs), or other devices that have the ability to connect to wireless network 220. Mobile devices 210 may connect, through a radio link, to wireless network 220. Through the radio link, mobile devices 210 may obtain data and/or voice services.

Wireless network 220 may include one or more devices that include radio interfaces to provide wireless connections to mobile devices 210. In addition, wireless network 220 may include network devices to provide core functionality relating to creating and managing communications with mobile devices 210. In one implementation, wireless network 220 may include a wireless core portion of a cellular network. For example, wireless network 220 may include a long term evolution (LTE) network. In this situation, wireless network 220 may be implemented using a flat, IP-based network architecture that includes one or more network devices or components that facilitate the providing of network access to mobile devices 210.

Application server 230 may include one or more computation and communication devices that provide services to mobile devices 210. Application server 230 may include, for example, a web server, a file server, or another type of server. Alternatively or additionally, application server 230 may provide services that extend the functionality of mobile devices 210. For example, application server 230 may implement GPS-related services, telephone services (e.g., a conference bridge service), or other services by which mobile device 210 may communicate with application server 230 to store or obtain information that is of use to a user of mobile device 210.

Device capabilities database 240 may include one or more computation and communication devices that store a database, file structure, or other data structure that stores information, referred to as capabilities information herein, relating to the capabilities associated with different models and/or manufacturers of mobile devices. In some implementations, device capabilities database 240 may maintain additional information, such as information relating to the software that is installed on a mobile device (e.g., the operating system version and/or the user application programs installed on a particular device) or software applications that are permitted (or not permitted) to be installed on particular models/manufacturers of mobile devices. Device capabilities database 240, according to some implementations, will be described in more detail below with reference to FIG. 3.

HSS 250 may include one or more computation and communication devices that act as a central database to maintain user-related and subscription-related information, such as user and/or subscription related information for users of wireless network 220. HSS 250 may implement functionality relating to mobility management, call and session establishment support, user authentication, and access authorization. In one implementation, HSS 250 may store identification information corresponding to mobile devices, such as a unique International Mobile Station Equipment Identity (IMEI) value for each mobile device 210 that connects to wireless network 220.

Although FIG. 2 illustrates example components of environment 200, in other implementations, environment 200 may contain fewer components, different components, differently arranged components, or additional components than those depicted in FIG. 2. Alternatively, or additionally, one or more components of environment 200 may perform one or more other tasks described as being performed by one or more other components of environment 200. Additionally, although application server 230, device capabilities database 240, and HSS 250 are illustrated in FIG. 2 as separate from wireless network 220, in some implementations, application server 230, device capabilities database 240, and/or HSS 250 may be implemented as part of wireless network 220.

FIG. 3 is a diagram illustrating an example of a data structure 300 that may be maintained by device capabilities database 240 to store capability information for mobile devices 210. In data structure 300, different mobile device types (e.g., different mobile device models/manufacturers) may be identified by a type allocation code (TAC) stored in TAC field 310. The TAC value for a mobile device may be included as part of the first eight digits of the IMEI for the mobile device.

For each TAC value stored in data structure 300, one or more parameters may be included that represent the capability information for the mobile device and that define the physical capabilities and/or software capabilities of the mobile device. An example set of parameters are illustrated for data structure 300 and include: screen size field 320, memory field 330, processor type field 340, touchscreen field 350, physical keyboard field 360, operating system (OS) version field 370, and authorized applications field 380. Screen size field 320 may indicate the size of the screen (e.g., the area, length, and/or with of the screen) for the corresponding mobile device. Memory field 330 may indicate an amount of memory installed in the corresponding mobile device. The memory indicated by memory field 330 may include, for example, random access memory (RAM), flash memory, or other types of memory. Processor type field 340 may indicate the type of processor (e.g., manufacturer and model number) and/or a value indicating the processing capacity of the processor (e.g., expressed as the number of operations that are performed by the processor in a second). Touchscreen field 350 may indicate whether the mobile device includes a touchscreen. In some implementations, touchscreen field 350 may also indicate, for mobile devices that include touchscreens, the technology type of the touchscreen (e.g., resistive touchscreen, capacitive touchscreen, etc.). Physical keyboard field 360 may indicate whether the mobile device includes a physical keyboard (as opposed to a virtual keyboard shown through software on a touchscreen). Operating system version field 370 may indicate the type and/or version number of the operating system installed at the mobile device. Authorized applications field 380 may include a list of one or more applications that are allowed to be installed or provisioned for the corresponding type of mobile device. Alternatively or additionally, authorized applications field 380 may indicate one or more applications or services that are not allowed or are not supported for the type of mobile device.

A number of example entries, in data structure 300, are illustrated in FIG. 3. For example, the first entry may correspond to a mobile device that is associated with the TAC value "12345612". This mobile device may include a 4.2 inch screen (field 320), 16 GB of memory (field 330), a 1 GHz processor (field 340), and a touchscreen but no physical keyboard (fields 350 and 360). The mobile device may also have the operating system "Android 4.1" installed (field 370), and may be associated with a number of applications ("App1, App2 . . . ") that are authorized to be installed on or provisioned for the mobile device (field 380).

Figure 4:
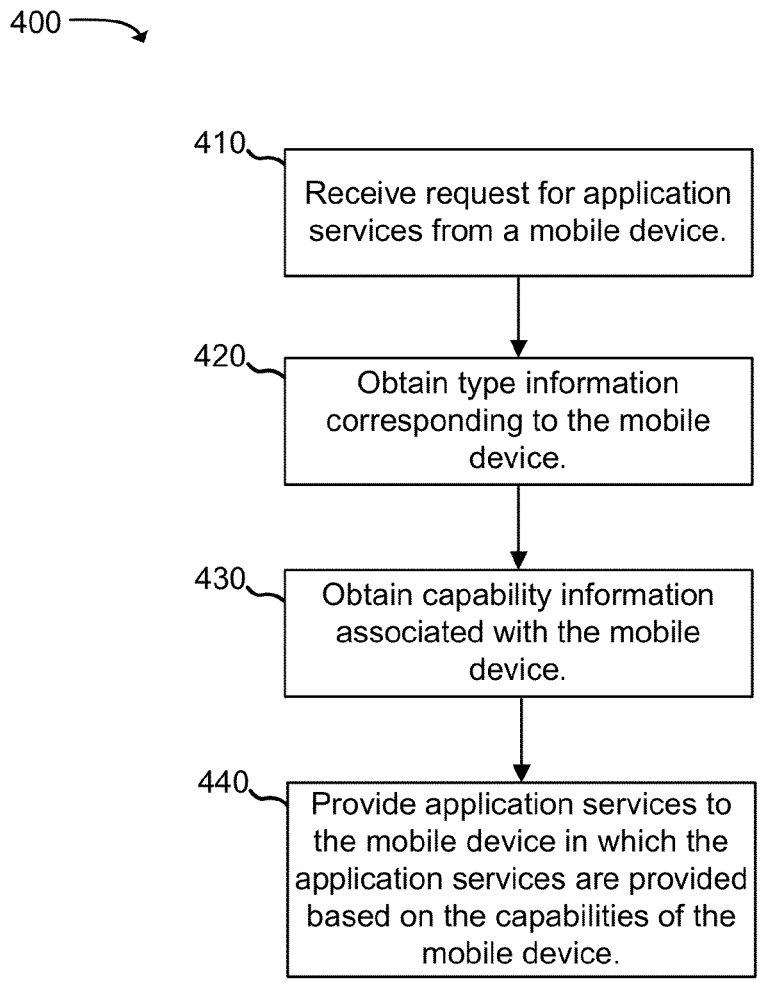
FIG. 4 is a flow chart illustrating an example process for providing services based on capability information relating to a mobile device.

FIG. 4 is a flow chart illustrating an example process 400 for providing services based on capability information relating to a mobile device. In one implementation, process 400 may be performed by application server 230.

Process 400 may include receiving a request for application services from a mobile device (block 410). For example, mobile device 210 may transmit a request, through wireless network 220, to application server 230. The request may be, for example, a request to use a particular service offered by application server 230, such as a service relating to the providing of a conference call, a service related to the providing of GPS-based navigation, or another service. As another example, the request may be a request to use or provision features provided by wireless network 220.

Process 400 may further include obtaining type information corresponding to the mobile device (block 420). The type information may include information that identifies the model and/or manufacturer of the mobile device. In one implementation, and as will be discussed in more detail below, application server 230 may contact HSS 250 to obtain the IMEI code corresponding to the mobile device. Application server 230 may then extract the TAC code from the IMEI value. The TAC code may serve to identify the model and/or manufacturer of the mobile device. In other implementations, other techniques may be used to obtain the type information corresponding to a mobile device. For example, the mobile device may include the type information as part of the request for application services.

Process 400 may further include obtaining capability information associated with the mobile device (block 430). As previously mentioned, the capability information relating to a mobile device may include information regarding hardware and/or software parameters corresponding to the mobile device. In one implementation, application server 230 may query device capabilities database 240, based on the type information for the mobile device, to obtain the capabilities relating to the mobile device. The capability information of the mobile device may include, for example, as illustrated in data structure 300, information relating to the screen size, the memory, the processor type, etc.

Process 400 may further include providing application services to the mobile device (block 440). The application services may be provided based on the capabilities of the mobile device (block 440). In one implementation, the application services may be customized or tailored based on the capabilities of the mobile device. For example, software processes, implemented by application server 230, may behave differently based on the capabilities of the mobile device.

As an example of application server 230 providing services based on the capabilities of the mobile device, application server 230 may vary the user interface provided to a user of the mobile device based on a screen size of the mobile device. For instance, for a mobile device with a relatively large screen, application server 230 may provide more information in a single page or window of the user interface. For mobile device with a smaller screen, application server 230 may provide the information over multiple pages.

As another example, for applications that are computationally intensive, application server 230 may offload a portion of the computations to a mobile device that includes a relatively fast processor, but may perform a greater portion of the computations, at application server 230, for a mobile device with a relatively slower processor. As yet another example, different user interfaces may be provided based on the input capabilities of the mobile device. For example, a mobile device that includes a touchscreen may receive a user interface that is designed for a touchscreen while a mobile device that does not include a touchscreen but includes a physical keyboard or keypad may receive a user interface that is designed for input via a keyboard/keypad.

As still another example, certain applications may be allowed to be installed only on certain models of mobile devices and/or certain applications may be prohibited from being installed on certain models of mobile devices. Similarly, certain functions, such as those provided in wireless network 220, may be allowed to be provisioned only on certain types of mobile devices.

Figure 5:
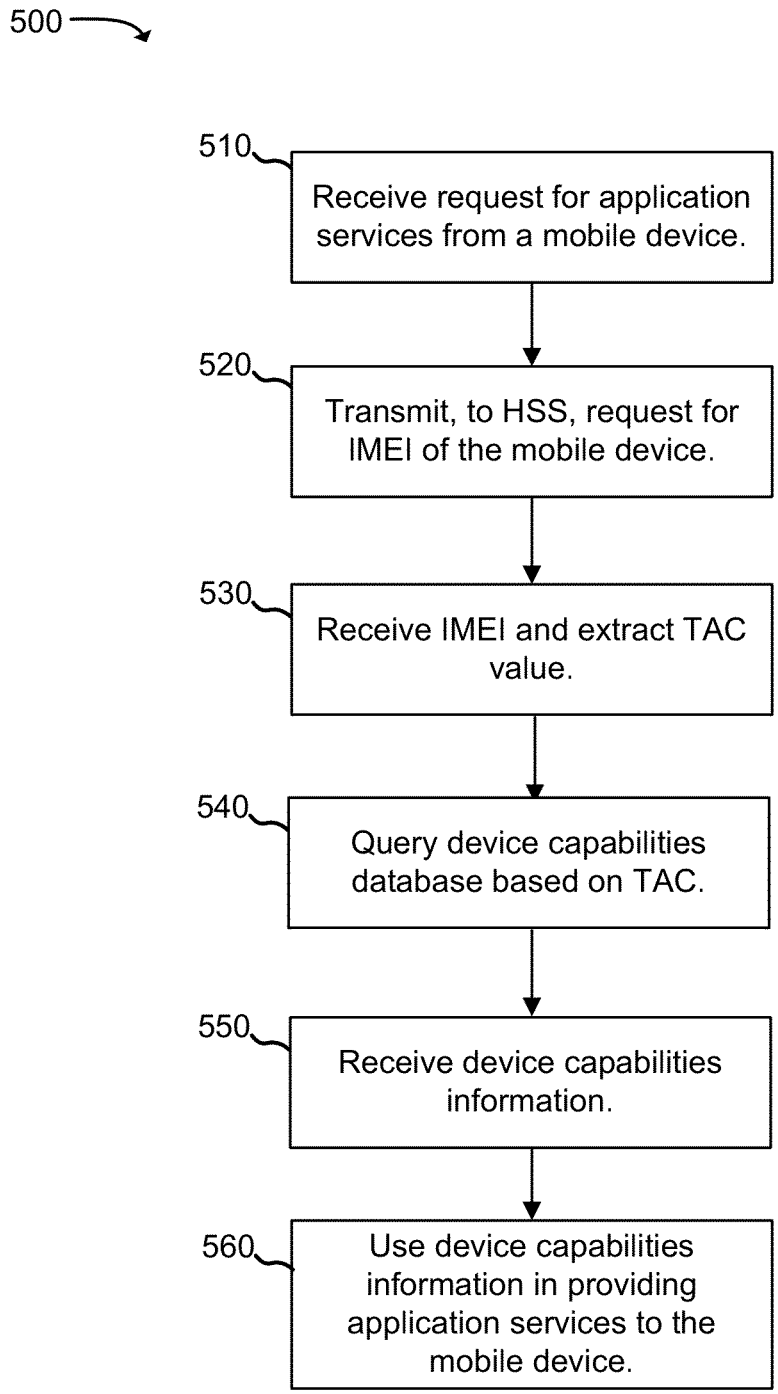
FIG. 5 is a flow chart illustrating an example process for providing services, based on capability information relating to a mobile device, in the context of a cellular wireless network.

FIG. 5 is a flow chart illustrating an example process 500 for providing services, based on capability information relating to a mobile device, in the context of a cellular wireless network, such as an LTE-based network. Process 500 may illustrate, in additional detail, one possible implementation of the process illustrated in FIG. 4. In one implementation, process 500 may be performed by application server 230.

Process 500 may include receiving a request for application services from a mobile device (block 510). For example, application server 230 may receive a request transmitted by mobile device 210 through wireless network 220. The request may be, for example, a request to use a particular service offered by application server 230, such as a service relating to the providing of a conference call, to the providing of GPS-based navigation, to the provisioning of features of mobile device, etc.

Process 500 may further include transmitting a request for the IMEI value corresponding to the mobile device (block 520). The request may be transmitted to a subscriber database, such as an HSS (e.g., HSS 250) (block 520). As previously mentioned, the IMEI value corresponding to a particular mobile device may uniquely identify the mobile device. In one implementation, application server 230 may query HSS 250, based on the mobile telephone number of the mobile device or based on other identification information of the mobile device, to obtain the IMEI value corresponding to the mobile device.

Process 500 may further include receiving the IMEI value and extracting the TAC value from the IMEI value (block 530). By convention, the TAC value may be extracted from the first eight characters of the IMEI. As previously mentioned, the TAC value may be associated with the type of mobile device (e.g., the TAC value may identify the manufacturer of mobile device 210 and the model of mobile device 210).

Process 500 may further include using the TAC value to query device capabilities database 240 (block 540). Device capabilities database 240 may use the TAC value to look up, such as in data structure 300, device capabilities information for the mobile device.

Process 500 may further include receiving the device capabilities information (block 550). The device capabilities information may be received in response to the query to device capabilities database 240. As previously mentioned, the device capabilities information may include information regarding hardware and/or software attributes of the mobile device.

Process 500 may further include providing application services to the mobile device (block 560). The application services may be provided based on the capabilities of the mobile device (block 560). As previously discussed, the application services may be customized or tailored based on the capabilities of the mobile device. For example, software processes, implement by application server 230, may behave differently based on the capabilities of the mobile device.

Figures 6A, 6B:
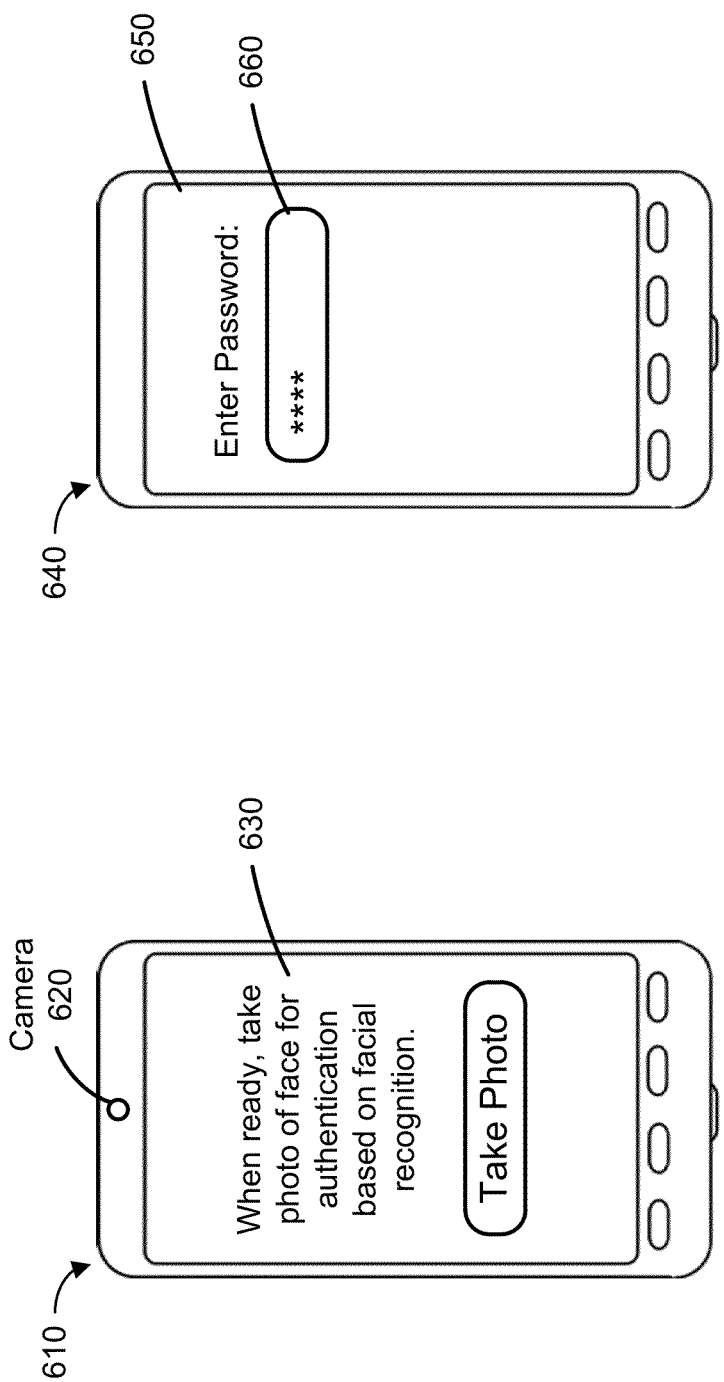
FIGS. 6A, 6B, and 7 are diagrams illustrating examples of providing application services to a mobile device based on the capabilities of the mobile device.

FIGS. 6A and 6B are diagrams illustrating one example of providing application services to a mobile device based on the capabilities of the mobile device (e.g., as performed in blocks 440 and 560). In this example, application server 230 may provide authentication services to mobile devices 210. For example, application server 230 may be used to provide authentication services for one or more servers or other network devices that need to verify the authenticity of a user of a mobile device 210. In this example, different authentication techniques may be used based on the capabilities of the mobile device.

As illustrated in FIG. 6A, a mobile device 610 may include a camera 620. As part of the determination of the device capabilities information, application server 230 may receive device capability information that indicates that camera 620 is present in mobile device 610. In some situations, additional details relating to the operation of camera 620, such as the resolution of camera 620, may also be received. Assume that application server 230 includes the ability to perform authentication based on recognition of facial features of the user of mobile device 610. Based on the fact that mobile device 610 includes camera 620, application server 230 may cause mobile device 610 to present an interface 630 in which the user is instructed to take a picture of the user's face using camera 620.

As illustrated in FIG. 6B, a mobile device 640 may not include a camera. Thus, based on the device capability information, application server 230 may determine that authentication based on facial recognition is not feasible. In this situation, application server 230 may determine to use password-based authentication or some other form of authentication. As shown, in interface 650, a password dialog box 660 may be presented to the user of mobile device 640, based on mobile device 640 not including a camera.

Figure 7:
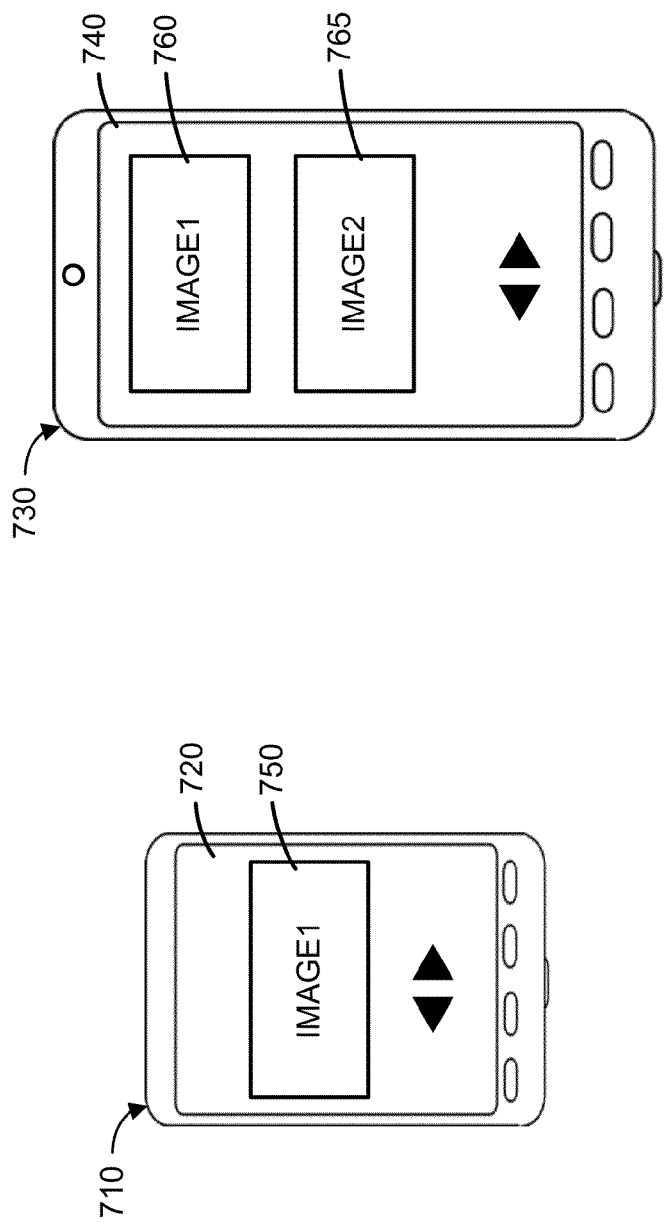

FIG. 7 is a diagram illustrating another example of providing application services to a mobile device based on the capabilities of the mobile device (e.g., as performed in blocks 440 and 560). In this example, application server 230 may provide a graphical interface to mobile devices in which the interfaces are formatted differently based on the screen size of the mobile device.

As illustrated in FIG. 7, a first mobile device 710 may include screen 720, and a second mobile device 730 may include screen 740. As illustrated, screen 740 may be larger than screen 720. As part of the determination of the device capabilities information, application server 230 may receive device capability information that indicates the size of screens 720/740 (e.g., as an area value, values measuring the length and width of the screen, etc.). Assume that at some point during the operation of application server 230, application server 230 transmits a series of images to mobile devices 710 and 730. Application server 230 may, based on the screen sizes of mobile devices 710 and 730, format the images differently in the user interfaces presented by mobile devices 710 and 740. For example, as illustrated, for the relatively small screen size associated with mobile device 710, a series of images may be presented one image at a time (e.g., a single image 750 may be presented on each screen page of mobile device 710). In contrast, for the relatively larger screen size associated with mobile device 730, a series of images may presented two images at a time (e.g., two images 760 and 765 may be presented on each screen page of mobile device 720). In this manner, application server 230 may optimize the user experience of a mobile device based on the screen size of the particular mobile device that is being used.

As described herein, device capabilities information, relating to a mobile device, may be used by an application server to tailor services provided by the application server, for the particular model/manufacture of the mobile device. The device capability information may be maintained by a database that may be queried based on TAC codes extracted from IMEI values corresponding to mobile device. Advantageously, additional functionality and an enhanced user experience may be provided to a user of the mobile device.

FIG. 8 is a diagram of example components of a device 800. Each of the devices illustrated in FIGS. 1, 2, 6 and/or 7 may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as a wide area/cellular network radio transceiver, an infrared ("IR") receiver, a Bluetooth radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with regard to FIGS. 4 and 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as "logic" that performs one or more functions. This logic may include hardware, such as an ASIC or a FPGA, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Further, the phrase "based on" is intended to mean "based, at least in part, on" unless explicitly stated otherwise.

What is claimed is:

1. A method comprising:
   receiving a request, by a server and from a mobile device, for services;
   obtaining, by the server, information indicating a type of the mobile device, the obtaining including:
     submitting a request to a home subscriber server (HSS) device, associated with a Long Term Evolution (LTE) network, the HSS maintaining subscriber profile information corresponding to a wireless network to which the mobile device connects,
     receiving a response, to the submitted request, that includes an International Mobile Station Equipment Identity (IMEI) value corresponding to the mobile device, and
     extracting a code, indicating the type of mobile device, from the IMEI value;
   obtaining, by the server, and based on the type of mobile device, information indicating capabilities of the mobile device, the information including hardware parameters associated with the mobile device, the hardware parameters including at least three of: a screen size of the mobile device, a memory capacity of the mobile device, a processor type of the mobile device, whether the mobile device includes a touchscreen, and whether the mobile device includes a physical keyboard; and
   providing, by the server, the services to the mobile device, in which the provided services are tailored for the mobile device based on the capabilities of the mobile device.

2. The method of claim 1, wherein the extracted code includes a type allocation code (TAC).

3. The method of claim 2, wherein obtaining the information indicating capabilities of the mobile device further includes:
   transmitting a query to a device capabilities database, the query including the TAC; and
   receiving the information indicating the capabilities of the mobile device in response to the query.

4. The method of claim 1, wherein the information indicating capabilities of the mobile device includes information indicating applications that are permitted or prohibited from being installed by the mobile device.

5. The method of claim 1, wherein the information indicating capabilities of the mobile device includes information indicating services that are permitted or prohibited from being provisioned for the mobile device.

6. The method of claim 1, wherein the providing of the services to the mobile device includes providing services relating to provisioning of the mobile device based on the capabilities of the mobile device.

7. The method of claim 1, wherein one of the included hardware parameters includes screen size, and wherein proving the services to the mobile devices includes tailoring a user interface, provided to the mobile device, based on screen size.

8. A server computing device comprising:
   a memory device;
   at least one processor to:
     receive a request, from a mobile device, for services;
     obtain information indicating a type of the mobile device, the obtaining including:
       submitting a request to a home subscriber server (HSS) device, associated with a Long Term Evolution (LTE) network, the HSS maintaining subscriber profile information corresponding to a wireless network to which the mobile device connects,
       receiving a response, to the submitted request, that includes an International Mobile Station Equipment Identity (IMEI) value corresponding to the mobile device, and
       extracting a code, indicating the type of the mobile device, from the IMEI value;
     obtain, based on the type of the mobile device, information indicating capabilities of the mobile device, the information including hardware parameters associated with the mobile device, the hardware parameters including at least three of: a screen size of the mobile device, a memory capacity of the mobile device, a processor type of the mobile device, whether the mobile device includes a touchscreen, and whether the mobile device includes a physical keyboard; and
     provide the services to the mobile device, in which the provided services are tailored for the mobile device based on the capabilities of the mobile device.

9. The server computing device of claim 8, wherein the extracted code includes a type allocation code (TAC).

10. The server computing device of claim 9, wherein the at least one processor, when obtaining the information indicating the capabilities of the mobile device, is further to:
    transmit a query to a device capabilities database, the query including the TAC; and
    receive the information indicating the capabilities of the mobile device in response to the query.

11. The server computing device of claim 8, wherein the information indicating capabilities of the mobile device includes information indicating applications that are permitted or prohibited from being installed by the mobile device.

12. The server computing device of claim 8, wherein the information indicating capabilities of the mobile device includes information indicating services that are permitted or prohibited from being provisioned for the mobile device.

13. The server computing device of claim 8, wherein the providing of the services to the mobile device includes providing services relating to provisioning of the mobile device based on the capabilities of the mobile device.

14. The server computing device of claim 8, wherein one of the included hardware parameters includes screen size, and wherein proving the services to the mobile devices includes tailoring a user interface, provided to the mobile device, based on screen size.

15. A system comprising:
    a device capabilities database to maintain information indicating capabilities of mobile devices that connect through the wireless network;
    a subscriber profile database, maintained by a home subscriber server (HSS) device, the HSS maintaining information associated with the mobile devices that connect through the wireless network;
    an application server to:
      receive a request for services from a mobile device corresponding to one of the mobile devices that connect through the wireless network;
      query the subscriber profile database, based on a telephone number of the mobile device, to obtain an International Mobile Station Equipment Identity (IMEI) value corresponding to the mobile device;
      extract, from the IMEI value, a code corresponding to a type of the mobile device;
      query the device capabilities database, based on the code, to obtain information indicating capabilities of the mobile device, the information including hardware parameters associated with the mobile device, the hardware parameters including at least three of: a screen size of the mobile device, a memory capacity of the mobile device, a processor type of the mobile device, whether the mobile device includes a touchscreen, and whether the mobile device includes a physical keyboard; and provide services to the mobile device based on the information indicating the capabilities of the mobile device.

16. The system of claim 15, wherein the code includes a type allocation code (TAC) that represents a model of the mobile device.

17. The system of claim 15, wherein the information indicating capabilities of the mobile device includes information indicating applications that are permitted or prohibited from being installed by the mobile device.

18. The system of claim 15, wherein the information indicating capabilities of the mobile device includes information indicating services that are permitted or prohibited from being provisioned for the mobile device.

19. The system of claim 15, wherein the providing of the services to the mobile device includes providing services relating to provisioning of the mobile device based on the capabilities of the mobile device.

20. The system of claim 15, wherein one of the included hardware parameters includes screen size, and wherein proving the services to the mobile devices includes tailoring a user interface, provided to the mobile device, based on screen size.

\* \* \* \* \*